United States Patent
Gorenne et al.

(12) 
(10) Patent No.: US 6,634,792 B1
(45) Date of Patent: Oct. 21, 2003

(54) RIGID ANTI-FRICTION BALL-BEARING

(75) Inventors: Michel Gorenne, Tours (FR); Carole Girardin, Joue-les-Tours (FR); Yannick Fierling, Petit-Rederching (FR)

(73) Assignee: SKF France, Montigny-le-Bretonneux (FR)

( * ) Notice: Subject to any disclaimer, the term of this patent is extended or adjusted under 35 U.S.C. 154(b) by 0 days.

(21) Appl. No.: 09/958,781

(22) PCT Filed: Apr. 6, 2000

(86) PCT No.: PCT/FR00/00872

§ 371 (c)(1),
(2), (4) Date: Jan. 3, 2002

(87) PCT Pub. No.: WO00/63569

PCT Pub. Date: Oct. 26, 2000

(30) Foreign Application Priority Data

Apr. 16, 1999 (FR) .............................. 99 04830

(51) Int. Cl.$^7$ .............................................. F16C 33/58
(52) U.S. Cl. ..................... 384/450; 384/513; 384/445; 384/490
(58) Field of Search .................. 384/445, 450, 384/490, 513, 516

(56) References Cited

U.S. PATENT DOCUMENTS 3,292,980 A * 12/1966 Gustafsson et al. ......... 384/516
3,696,483 A * 10/1972 Burk ........................ 29/898.11
5,782,563 A * 7/1998 Muto et al. ................. 384/450

FOREIGN PATENT DOCUMENTS

| CA | 2075128 | 8/1996 |
| DE | 1169 210 | 4/1964 |
| EP | 0 528 193 | 2/1993 |
| EP | 1070864 A1 * | 1/2001 |
| JP | 410037951 A * | 2/1998 |

* cited by examiner

Primary Examiner—David A. Bucci
Assistant Examiner—Julie K. Smith
(74) Attorney, Agent, or Firm—Smith, Gambrell & Russell (57) ABSTRACT

An anti-friction bearing device comprising an outer ring (11) provided with an outer surface and a bore on which a toroidal bearing inner race (14) is formed, an inner ring(15) which is provided with a bore and a cylindrical outer surface on which a toroidal bearing outer race (18) is formed, a row of balls (19) which are disposed between the two bearing races, and a cage which can maintain a regular circumferential spacing between the balls. The ratio between the radial thickness of the outer ring, when taken between the bottom of the bearing inner race and the outer surface of the outer ring and the diameter of the balls ranges from 0.4 to 0.7. The ratio between the radial thickness of the outer ring, when taken between the bottom of the bearing inner race and the radial thickness of the inner ring when taken between the bottom of the outer bearing race and the bore of the inner ring ranges from 1.1 to 1.6.

16 Claims, 6 Drawing Sheets

RIGID ANTI-FRICTION BALL-BEARING

The invention relates to the field of so-called "rigid" single row ball bearings.

Such bearings comprise an outer ring equipped with a toroidal raceway on its bore, an inner ring equipped with a toroidal raceway on its external surface, a row of balls arranged between the two raceways, in contact with said raceways, the profile of the raceways being symmetric with respect to a plane passing through the center of the balls, a cage in the form of an annular element with a certain number of cavities intended to house the balls and space them apart circumferentially in an appropriate way to avoid any imbalance when the bearing is running, and possibly sealing members in the form of seals or flanges arranged on one or both sides of the bearing so as to prevent any ingress of contaminants from the outside and prevent any leak of lubricant to the outside of the bearing.

Such bearings are known and used in many applications.

In order to make for easier sourcing and interchangeability of such bearings from one manufacturer to another, the dimensions relating to the parameters defining the size and fitting of these bearings have been standardized to give so-called "ISO" series of bearings.

These series call upon basic four-figure designations (6000, 6200, 6300 series) common to all bearing manufacturers, nominal size dimensions (D=outside diameter, d=bore and B=width) identical across all manufacturers corresponding to each basic designation.

The user thus has standard ranges of bearings available which makes his choice easier and ensures that the bearings will be interchangeable.

The functional life of a bearing is not tied only to the basic bearing material but depends also on the lubricant used and on the other elements which make up the bearing, such as the cage or the sealing members.

While conventional bearings in the ISO range are entirely satisfactory in most applications, failures through lack of lubrication or through excessively short grease life have been observed in certain instances.

These are mainly applications relating to the field of electric motors, in which the bearing is not very heavily loaded with respect to its load-bearing capacity but is running at high speed and at relatively high temperatures.

In this type of application, it is usually the qualitative or quantitative degradation of the grease, rather than the load-bearing capacity of the bearing which governs the bearing life. Attempts at preventing failures may be made by using, for example, so-called "open" (flangeless and seal-less) bearings lubricated with grease and which are periodically repacked, which is expensive.

One of the objects of the invention is to propose a new range of bearings better suited to these applications, having overall size dimensions identical to those of the conventional ISO bearings, but with internal construction features that make it possible to guarantee a high service life by virtue of excellent lubrication with grease held in by effective sealing.

The ball bearing device according to the invention is of the type comprising an outer ring equipped with an outer surface and with a bore on which a toroidal inner raceway is formed, an inner ring equipped with a bore and with a cylindrical outer surface on which a toroidal outer raceway is formed, a row of balls arranged between the two raceways, and a cage capable of keeping a uniform circumferential spacing between the balls. The ratio between the radial thickness of the outer ring taken between the bottom of the inner raceway and the outer surface of the outer ring, and the diameter of the balls is between 0.4 and 0.7. The ratio between the radial thickness of the outer ring taken between the bottom of the inner raceway and the outer surface of the outer ring, and the radial thickness of the inner ring taken between the bottom of the outer raceway and the bore of the inner ring is between 1.1 and 1.6.

In other words, by comparison with conventional ISO bearings, the diameter of the balls is smaller, the radial thickness of the outer ring is greater at the bottom of the raceway and the radial thickness of the inner ring at the bottom of the raceway is kept more or less the same.

Advantageously, the ratio between the radial thickness of the outer ring taken between the bottom of the inner raceway and the outer surface of the outer ring, and the outside diameter of the bearing is between 0.045 and 0.08.

Advantageously, the ratio between the width of the rings and the diameter of the balls is between 1.3 and 2.2.

Advantageously, the ratio between the width of the rings and the radial thickness of the outer ring taken between the bottom of the inner raceway and the outer surface of the outer ring is between 2.5 and 4.2.

As a preference, the values of the outside diameter of the bearing, of the inside diameter of the bearing, and of the width of the bearing are identical to those of a conventional single row rigid ball bearing of the standardized ISO range.

In one embodiment of the invention, the ratio between the radial thickness of the outer ring taken between the bottom of the inner raceway and the outer surface of the outer ring, and the diameter of the balls is between 0.5 and 0.6, in that the ratio between the radial thickness of the outer ring taken between the bottom of the inner raceway and the outer surface of the outer ring, and the radial thickness of the inner ring taken between the bottom of the outer raceway and the bore of the inner ring is between 1.1 and 1.5, in that the ratio between the radial thickness of the outer ring taken between the bottom of the inner raceway and the outer surface of the outer ring, and the outside diameter of the bearing is between 0.045 and 0.06, in that the ratio between the width of the rings and the diameter of the balls is between 1.7 and 2.2, and in that the ratio between the width of the rings and the radial thickness of the outer ring taken between the bottom of the inner raceway and the outer surface of the outer ring is between 3 and 4.2, the values of the outside diameter of the bearing, of the bore of the bearing, and of the width of the bearing being identical to those of a conventional single row rigid ball bearing of the 6000 series of the standardized ISO range.

In another embodiment of the invention, the ratio between the radial thickness of the outer ring taken between the bottom of the inner raceway and the outer surface of the outer ring, and the diameter of the balls is between 0.4 and 0.7, in that the ratio between the radial thickness of the outer ring taken between the bottom of the inner raceway and the outer surface of the outer ring, and the radial thickness of the inner ring taken between the bottom of the outer raceway and the bore of the inner ring is between 1.2 and 1.6, in that the ratio between the radial thickness of the outer ring taken between the bottom of the inner raceway and the outer surface of the outer ring, and the outside diameter of the bearing is between 0.055 and 0.75, in that the ratio between the width of the rings and the diameter of the balls is between 1.5 and 1.9, and in that the ratio between the width of the rings and the radial thickness of the outer ring taken between the bottom of the inner raceway and the outer surface of the outer ring is between 2.5 and 4, the values of the outside diameter of the bearing, of the bore of the bearing, and of the width of the bearing being identical to those of a conventional single row rigid ball bearing of the 6200 series of the standardized ISO range.

In another embodiment of the invention, the ratio between the radial thickness of the outer ring taken between the bottom of the inner raceway and the outer surface of the outer ring, and the diameter of the balls is between 0.4 and 0.55, in that the ratio between the radial thickness of the outer ring taken between the bottom of the inner raceway and the outer surface of the outer ring, and the radial thickness of the inner ring taken between the bottom of the outer raceway and the bore of the inner ring is between 1.3 and 1.5, in that the ratio between the radial thickness of the outer ring taken between the bottom of the inner raceway and the outer surface of the outer ring, and the outside diameter of the bearing is between 0.065 and 0.08, in that the ratio between the width of the rings and the diameter of the balls is between 1.3 and 1.8, and in that the ratio between the width of the rings and the radial thickness of the outer ring taken between the bottom of the inner raceway and the outer surface of the outer ring is between 3 and 3.6, the values of the outside diameter of the bearing, of the bore of the bearing, and of the width of the bearing being identical to those of a conventional single row rigid ball bearing of the 6300 series of the standardized ISO range.

By virtue of the invention, in certain applications which would use open bearings lubricated by the circulation of oil, use may be made of bearings fitted with seals and greased for life.

Because of the reduction in the diameter of the balls, the volume not swept by the balls when the bearing is running is increased, and there is more space in the axial direction for fitting sealing elements such as seals or flanges which will therefore perform better both in terms of static or dynamic sealing and in terms of anchorage on one of the two rings. Lateral reserves of grease are increased.

Use may be made of a synthetic cage with a thicker heal, which allows higher speeds.

Use may be made of a synthetic cage in places where previously it was necessary to use a sheet metal cage with important advantages in terms of cost reduction, running noise reduction, rubbing torque reduction (less energy consumed, less heat generated), and increased grease life.

Specifically, it is known that the use of a plastic cage extends the life of the grease considerably, by a factor of the order of 2 to 3, by comparison with a steel cage depending on the load conditions and the application.

The zones of contact between the balls and the raceways are smaller, which leads to a reduction in the effects of churning/throttling of the grease, which also extends its life, reduces the torque and therefore the internal heating of the bearing, and its energy consumption.

The mass of the rotating parts is lowered because of the reduction in the diameter of the balls, which leads to a reduction in inertia, in gyroscopic effects, and in centrifugal forces.

In the electric motor applications, the outer ring is fixed and generally mounted in a light alloy housing, while the inner ring rotates and is mounted tightly on a rotating shaft.

In the context of this invention, the aforementioned advantages are enhanced by giving the outer ring a greater thickness at the bottom of the raceway than is the case for an outer ring of a conventional bearing of the ISO range. The pitch diameter Dm of the bearing, measured at the center of the balls, and therefore the peripheral speed of the balls at this pitch diameter is reduced, thus increasing the possibilities of raising the rotational speed of the rotating ring by comparison with a conventional bearing while at the same time reducing the running temperature.

The transmission of noise and vibration from the bearing to the housing of the outer ring is damped. The possibility of clamping the outer ring in its housing with lesser effects on the internal clearance of the bearing is increased. The detrimental effects that a housing with mediocre geometric properties has on the outer ring of the bearing are reduced.

Finally, the values of external size, outside diameter D, inside diameter d and width B of a bearing according to the invention are identical to those of a corresponding reference of conventional single row rigid ball bearings of the ISO range.

The bearings according to the invention are thus perfectly interchangeable with conventional bearings of the ISO range and afford a great many advantages.

The present invention will be better understood and other advantages will become apparent from reading the detailed description of one embodiment taken by way of non-limiting example and illustrated by the appended drawings, in which.

Figure 1:
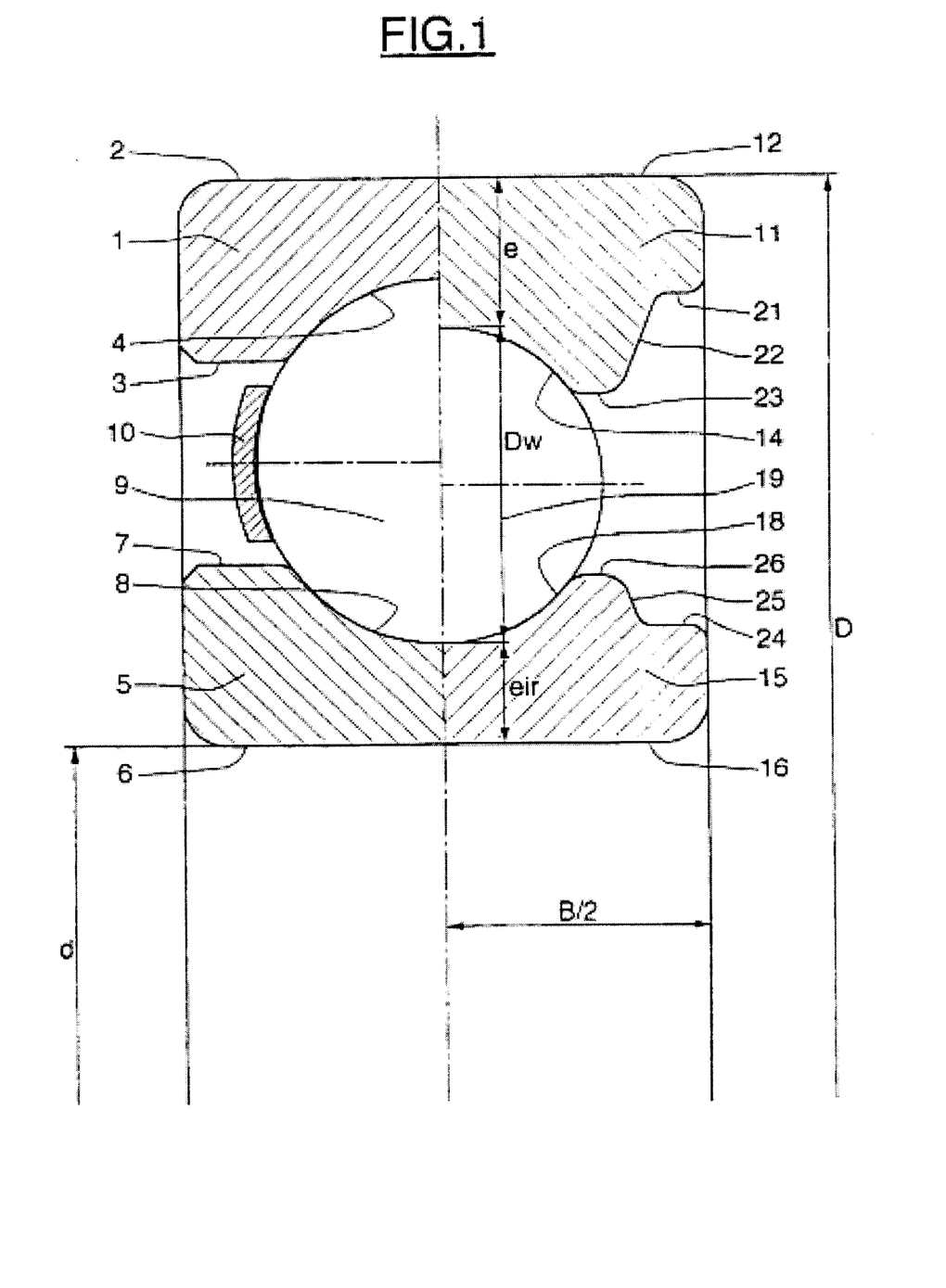
FIG. 1 is a view in axial section of a bearing, the left-hand half section being that of a conventional bearing and the right-hand half section being that of a bearing according to the invention.

As can be seen in FIG. 1, a conventional single row rigid ball bearing (left-hand half of the figure) comprises an outer ring 1 equipped with a cylindrical outer surface 2 and with a bore 3 in which a toroidal raceway 4 is formed, an inner ring 5 equipped with a bore 6 and with a cylindrical outer surface 7 in which a toroidal raceway 8 is formed, a row of balls 9 arranged between the raceways 4 and 8, and a cage 10 for keeping a uniform circumferential spacing of the balls 9.

The cage 10 is made of steel sheet. It can be seen that the radial thickness of the outer ring 1 and that of the inner ring 5 are approximately equal. The expression "radial thickness" is to be understood as meaning the distance separating the bottom of the raceway of one of the rings, taken in the radial plane passing through the center of the balls, and the cylindrical surface of the same ring, this cylindrical surface being an outer one or an inner one respectively according to whether the ring is itself the outer ring or the inner ring.

In the right-hand half of the figure, in which a single row rigid ball bearing according to the invention is shown, the references of elements similar to those of the left-hand part have been increased by the number 10. It can be seen that the balls 19 are small in diameter by comparison with the balls 9 of the conventional bearing, this reduction being made while at the same time maintaining the radial thickness of the inner ring 15, but increasing the thickness of the outer ring 11.

This reduction in the diameter of the balls also has the effect of reducing the space they occupy in the axial direction and therefore of increasing the axial space available for a sealing member and/or the lubricant. For this purpose, on the outer ring 11 there is a cylindrical portion 21 adjacent the lateral face of said outer ring 11 and of a diameter greater than the maximum diameter of the raceway 14. The join between the cylindrical portion 21 and the raceway 14 is by virtue of an oblique portion 22 directed, from the cylindrical portion 21, radially inward and axially toward the balls 19, then via a rounded portion 23. A seal or flange may be securely push-fitted onto the cylindrical portion 21 with, if necessary, a flexible static lip contacting the oblique portion 22.

Similarly, a cylindrical portion 24 of a diameter smaller than that of the outer cylindrical surface 7 of the inner ring 5 of a conventional bearing is provided on the inner ring 15. The cylindrical portion 24 is joined to the raceway 18 via an oblique portion 25 directed radially outward and axially toward the balls 19, then via a rounded portion 26.

It is thus possible to provide a seal mounted on the outer ring 11 and having a lip contacting the cylindrical surface 24 and an additional lip contacting the oblique portion 25. It is thus possible to afford highly protective sealing.

In addition, the fact that the cylindrical portion 24 is of a smaller diameter than the outer cylindrical surface 7 makes it possible to reduce the relative linear speed of the rubbing lip of a seal with respect to said cylindrical portion 24, hence reducing the sealing lip wear and reducing the energy consumption and therefore the heating.

The fact that the cylindrical portion 21 of the outer ring 11 is of a higher diameter than the bore 3 of the conventional outer ring 1 allows more effective anchoring in the circumferential direction of the seal with a reduction in the risk of the seal accidentally turning with respect to the outer ring 11 as a result of the frictional torque, by virtue of its being push-fitted onto a surface of larger diameter.

Of course, without departing from the scope of the invention, use could be made of other profiles of the surfaces 21 and/or 34 for achieving more sophisticated sealing portions and/or anchorages.

FIG. 1 also shows the various dimensions of a bearing. It can be seen that the external dimensions are maintained when changing from a conventional bearing to a bearing according to the invention. The outside diameter D of the outer ring 2 is equal to that of the outer ring 12. The same is true of the bores d 6 and 16 of the inner rings 5 and 15 and of the width B taken between the radial lateral faces of the rings. By contrast, it can be seen that the diameter of the balls $D_w$ and the thickness e of the outer ring 11 have been modified.

In FIG. 1, it can be seen that the thickness $e_{ir}$ at the bottom of the groove of the inner ring 15 is maintained. However, by way of a variation, it would be possible to envision increasing or decreasing this thickness $e_{ir}$ slightly for applications in which an increase in the rigidity or in the flexibility of the inner ring 15 would present advantages.

FIGS. 2 to 6 look at the corresponding values of certain parameters for new generation bearings according to the invention and for conventional bearings of the ISO series, for determined bore sizes chosen from the standard ISO range.

Figure 2:
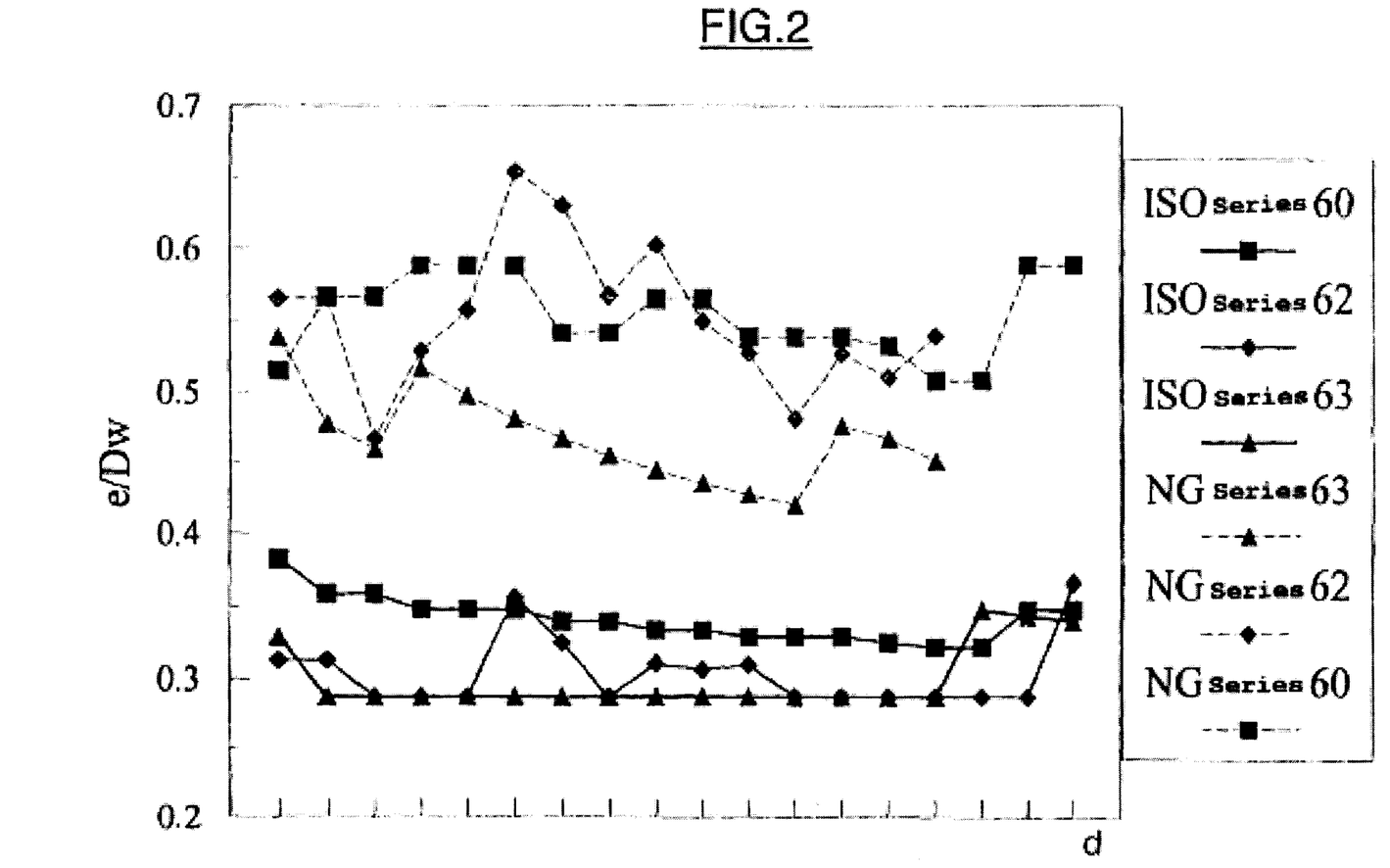
FIG. 2 is a graph featuring, on the ordinate axis, the values of the ratio between the thickness of the outer ring taken between the bottom of the raceway and the outside diameter of the outer ring, and the diameter of the balls established in each series of bearings for a certain number of conventional references of the ISO series and references according to the invention, in increasing bearing bore size, each point on the abscissa axis corresponding to a standardized bore value d featured in the range of ISO bearings.

Thus, FIG. 2 depicts the variations in the parameter $e/D_w$ for various standardized bore sizes.

For example, the first point on the abscissa axis corresponds to a bearing bore size of 40 mm.

To this value there correspond, on the ordinate axis, the values of $e/D_w$ for conventional 40 mm bore bearings of the ISO 60 series (6008), 62 series (6208) and 63 series (6308), and the $e/D_w$ values for the corresponding 40 mm bore new generation bearings.

Curves corresponding to the conventional series of bearings of the ISO range are identified in the key as ISO series 60, 62, 63.

Curves corresponding to the corresponding series of new generation bearings are identified in the key as NG series 60, 62, 63.

It can be seen that the parameter $e/D_w$ is always higher than 0.4 for bearings according to the invention being, depending on the series, between 0.5 and 0.6, between 0.4 and 0.7 or between 0.4 and 0.55, always with a difference of at least 0.13 by comparison with the bearing corresponding to the same series but of the conventional type.

Figure 3:
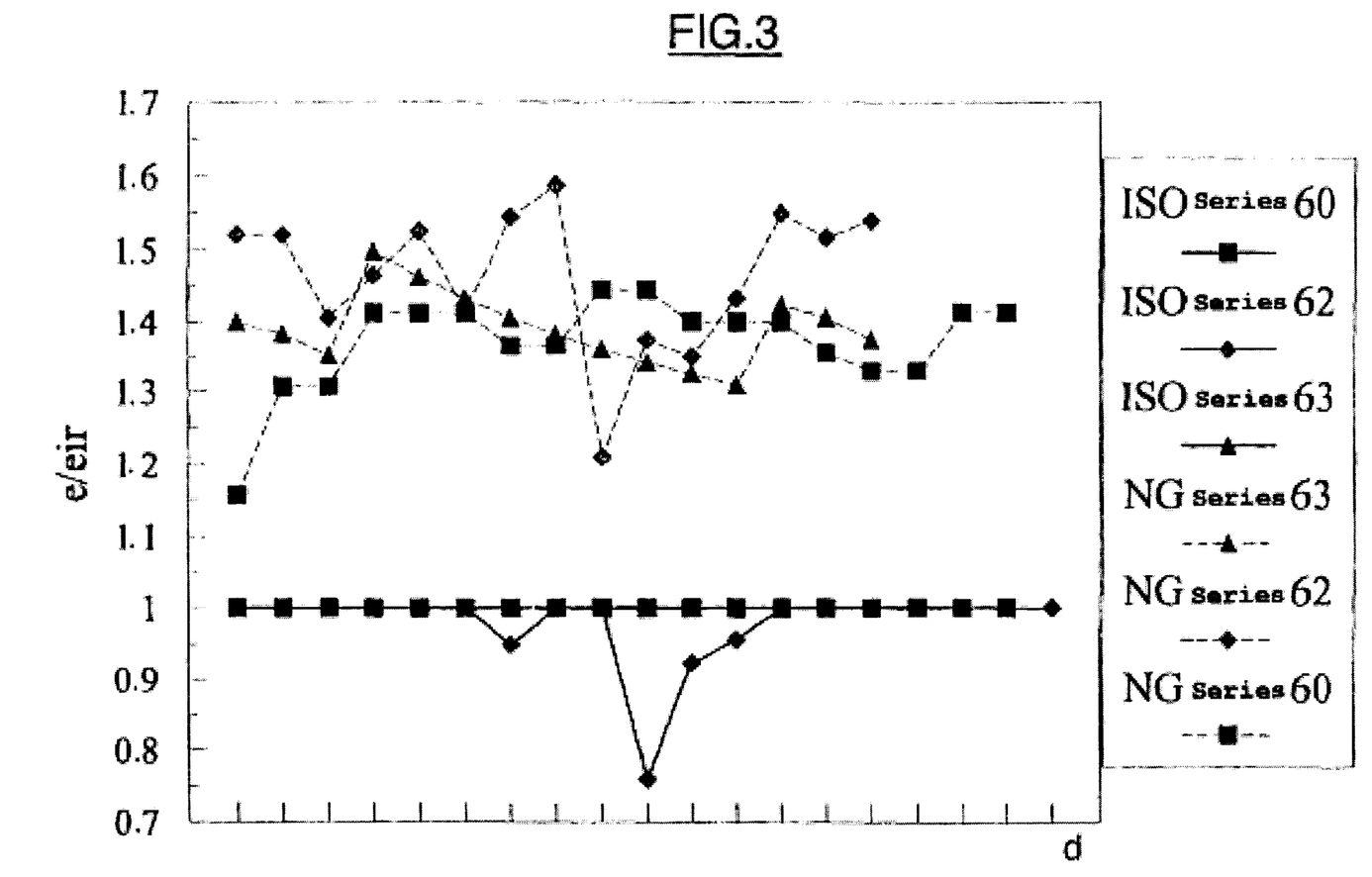
FIG. 3 is a graph similar to that of FIG. 2, featuring, on the ordinate axis, the values of the ratio between the thickness of the outer ring taken between the bottom of the raceway and the outside diameter of the outer ring, and the thickness of the inner ring taken between the bottom of the raceway and the bore of the inner ring, in increasing bore size.

In FIG. 3 it can be seen that the parameter $e/e_{ir}$ is always between 1.1 and 1.6 for bearings according to the invention. Depending on the series, this parameter is between 1.1 and 1.5, between 1.2 and 1.6 or between 1.3 and 1.5 with a minimum difference of at least 0.15 by comparison with the conventional bearing of the same series.

Figure 4:
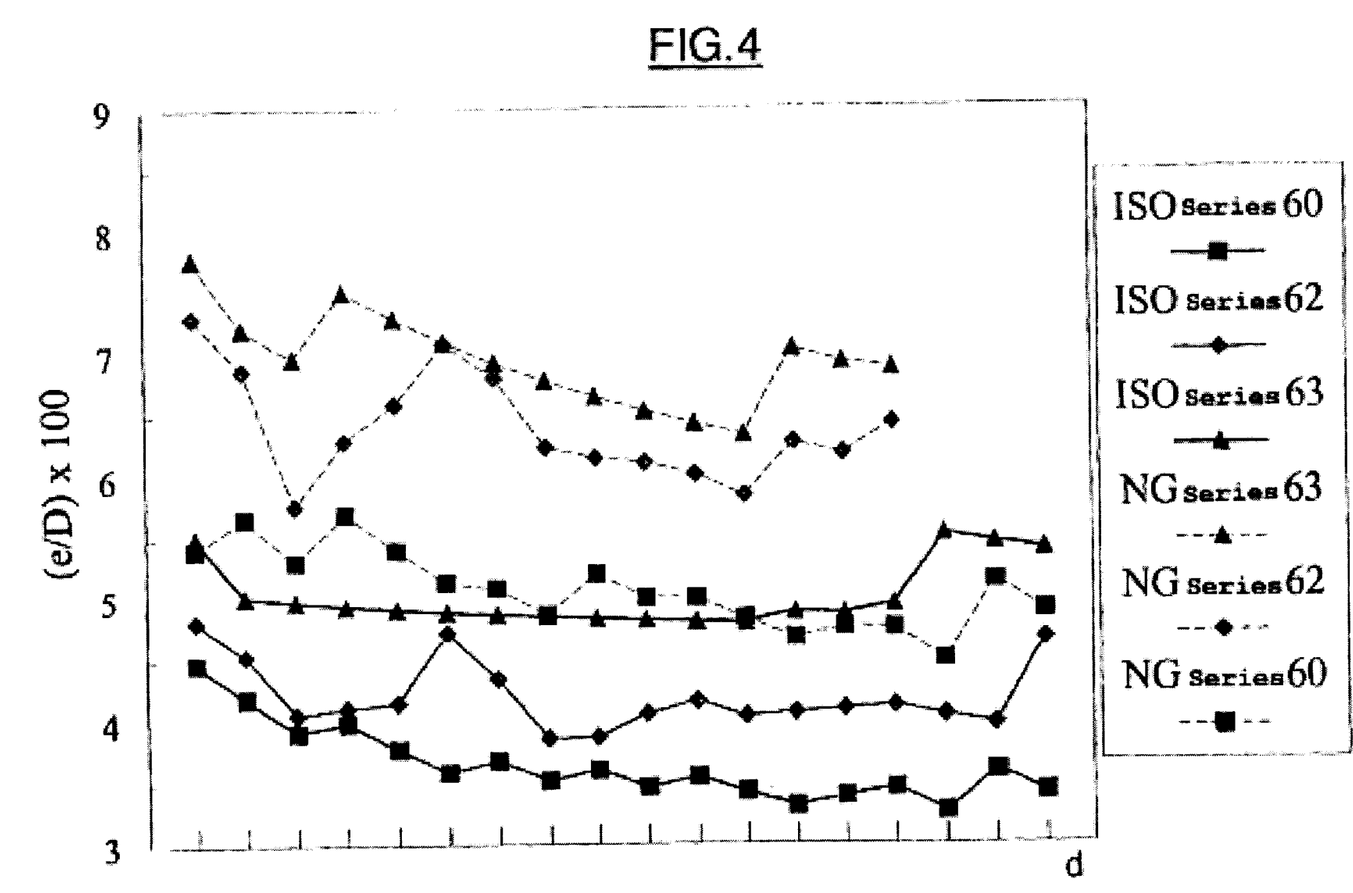
FIG. 4 is a graph similar to that of FIG. 2 featuring, on the ordinate axis, the values of the ratio between the thickness of the outer ring taken between the bottom of the raceway and the outside diameter of the outer ring, and the outside diameter of the bearing, in increasing bearing bore size.

In FIG. 4 it can be seen that the parameter e/D is, for bearings according to the invention, between 0.045 and 0.08. Depending on the series, it is between 0.045 and 0.06, between 0.055 and 0.075 or between 0.065 and 0.08. The minimum difference compared with a corresponding bearing of the same conventional series is 0.01 at minimum.

Figure 5:
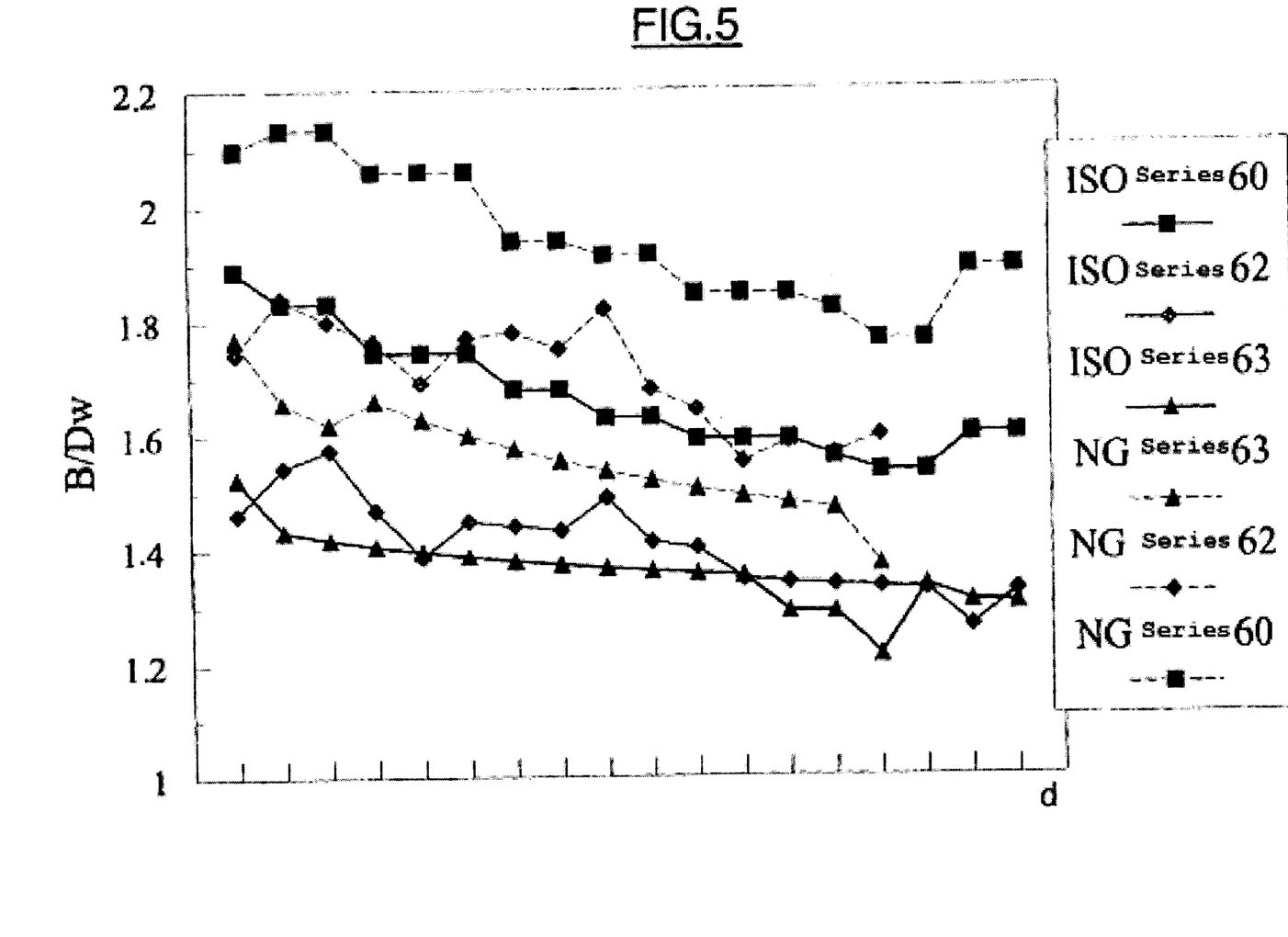
FIG. 5 is a graph similar to that of FIG. 2, featuring, on the ordinate axis, the values of the ratio between the width of the rings and the diameter of the balls, in increasing bore size.

In FIG. 5 it can be seen that the parameter $B/D_w$, for a bearing according to the invention, is between 1.3 and 2.2. Depending on the series, this parameter is between 1.7 and 2.2, between 1.5 and 1.9 or between 1.3 and 1.8, with a difference by comparison with the corresponding bearing of the same series but of conventional type of 0.135 at minimum.

Figure 6:
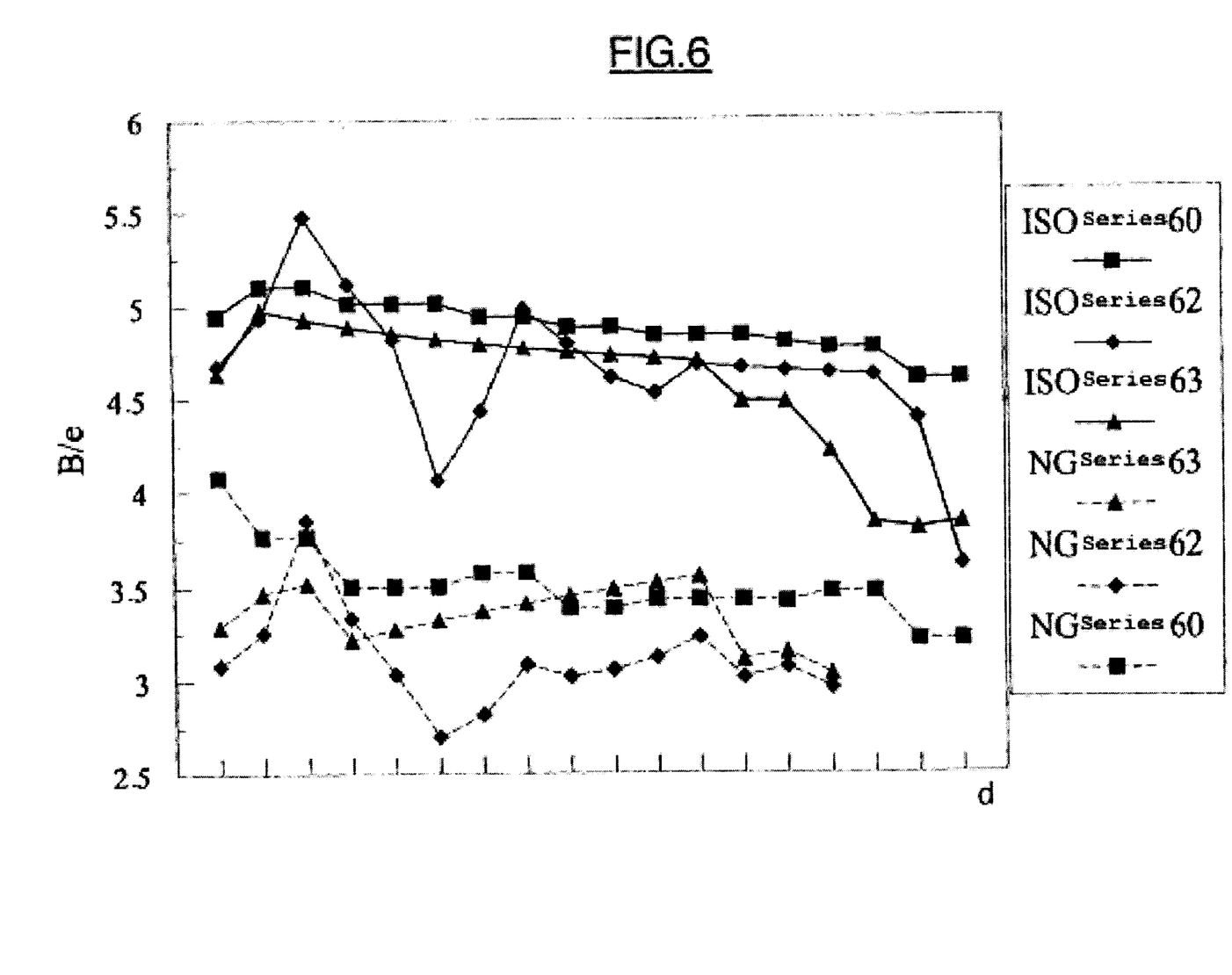
FIG. 6 is a graph similar to that of FIG. 2, featuring, on the ordinate axis, the values of the ratio between the width of the rings and the thickness of the outer ring taken between the bottom of the raceway and the outside diameter of the outer ring, in increasing bore size.

In FIG. 6 it can be seen that the value of the parameter B/e for a bearing according to the invention is between 2.5 and 4.2. Depending on the series, this parameter is between 3 and 4.2, between 2.5 and 4 or between 3 and 3.6, with a minimum difference by comparison with a corresponding bearing of the same series but of conventional type of 0.85.

What is claimed is:

1. A single row deep groove ball bearing device comprising an outer ring equipped with an outer surface and with a bore on which a toroidal inner raceway is formed, an inner ring equipped with a bore and with a cylindrical outer surface on which a toroidal outer raceway is formed, a row of balls arranged between the two raceways, and a cage capable of keeping a uniform circumferential spacing between the balls, wherein the ratio between the radial thickness of the outer ring taken between the bottom of the inner raceway and the outer surface of the outer ring, and the diameter of the balls is between 0.4 and 0.7, and the ratio between the radial thickness of the outer ring taken between the bottom of the inner raceway and the outer surface of the outer ring, and the radial thickness of the inner ring taken between the bottom of the outer raceway and the bore of the inner ring is between 1.1 and 1.6.

2. The ball bearing as claimed in claim 1, wherein the ratio between the radial thickness of the outer ring taken between the bottom of the inner raceway and the outer surface of the outer ring, and the outside diameter of the bearing is between 0.045 and 0.08.

3. The ball bearing as claimed in claim 1, wherein the ratio between the width of the rings and the diameter of the balls is between 1.3 and 2.2.

4. The ball bearing as claimed in claim 1, wherein the ratio between the width of the rings and the radial thickness of the outer ring taken between the bottom of the inner raceway and the outer surface of the outer ring is between 2.5 and 4.2.

5. The ball bearing as claimed in claim 1, wherein the ratio between the radial thickness of the outer ring taken between the bottom of the inner raceway and the outer surface of the outer ring, and the diameter of the balls is between 0.5 and 0.6 and the ratio between the radial thickness of the outer ring taken between the bottom of the inner raceway and the outer surface of the outer ring, and the radial thickness of the inner ring taken between the bottom of the outer raceway and the bore of the inner ring is between 1.1 and 1.5, the ratio between the radial thickness of the outer ring taken between the bottom of the inner raceway and the outer surface of the outer ring, and the outside diameter of the bearing is between 0.045 and 0.06, the ratio between the width of the rings and the diameter of the balls is between 1.7 and 2.2, and the ratio between the width of the rings and the radial thickness of the outer ring taken between the bottom of the inner raceway and the outer surface of the outer ring is between 3 and 4.2.

6. The ball bearing as claimed in claim 1, wherein the ratio between the radial thickness of the outer ring taken between the bottom of the inner raceway and the outer surface of the outer ring, and the diameter of the balls is between 0.4 and 0.7 and the ratio between the radial thickness of the outer ring taken between the bottom of the inner raceway and the outer surface of the outer ring, and the radial thickness of the inner ring taken between the bottom of the outer raceway and the bore of the inner ring is between 1.2 and 1.6, the ratio between the radial thickness of the outer ring taken between the bottom of the inner raceway and the outer surface of the outer ring, and the outside diameter of the bearing is between 0.055 and 0.75, the ratio between the width of the rings and the diameter of the balls is between 1.5 and 1.9, and the ratio between the width of the rings and the radial thickness of the outer ring taken between the bottom of the inner raceway and the outer surface of the outer ring is between 2.5 and 4.

7. The ball bearing as claimed in claim 1, wherein the ratio between the radial thickness of the outer ring taken between the bottom of the inner raceway and the outer surface of the outer ring, and the diameter of the balls is between 0.4 and 0.55, the ratio between the radial thickness of the outer ring taken between the bottom of the inner raceway and the outer surface of the outer ring, and the radial thickness of the inner ring taken between the bottom of the outer raceway and the bore of the inner ring is between 1.3 and 1.5, the ratio between the radial thickness of the outer ring taken between the bottom of the inner raceway and the outer surface of the outer ring, and the outside diameter of the bearing is between 0.065 and 0.08, the ratio between the width of the rings and the diameter of the balls is between 1.3 and 1.8, and the ratio between the width of the rings and the radial thickness of the outer ring taken between the bottom of the inner raceway and the outer surface of the outer ring is between 3 and 3.6.

8. The ball bearing as claimed in claim 1, wherein the values of the outside diameter of the bearing, of the bore of the bearing, and of the width of the bearing are identical to those of a conventional single row rigid ball bearing of the standardized ISO range.

9. A ball bearing device, comprising:
an outer ring equipped with an outer surface and with a bore on which a toroidal inner raceway is formed;
an inner ring equipped with a bore and with a cylindrical outer surface on which a toroidal outer raceway is formed;
a row of balls arranged between the two raceways; and
and a cage which receives the row of balls and maintains a uniform circumferential spacing between the balls, and wherein a ratio between the radial thickness of the outer ring taken between the bottom of the inner raceway and the outer surface of the outer ring, and the diameter of the balls ranges from 0.4 and 0.7, and in that the ratio between the radial thickness of the outer ring taken between the bottom of the inner raceway and the outer surface of the outer ring, and the radial thickness of the inner ring taken between the bottom of the outer raceway and the bore of the inner ring ranges from 1.1 and 1.6.

10. The ball bearing as claimed in claim 9, wherein the ratio between the radial thickness of the outer ring taken between the bottom of the inner raceway and the outer surface of the outer ring, and the outside diameter of the bearing ranges from 0.045 and 0.08.

11. The ball bearing as claimed in claim 10, wherein the ratio between the width of the rings and the diameter of the balls ranges from 1.3 and 2.2.

12. The ball bearing as claimed in claim 10, wherein the ratio between the width of the rings and the radial thickness of the outer ring taken between the bottom of the inner raceway and the outer surface of the outer ring ranges from 2.5 and 4.2.

13. The ball bearing as claimed in claim 10, wherein the ratio between the radial thickness of the outer ring taken between the bottom of the inner raceway and the outer surface of the outer ring, and the diameter of the balls ranges from 0.5 and 0.6 and that the ratio between the radial thickness of the outer ring taken between the bottom of the inner raceway and the outer surface of the outer ring, and the radial thickness of the inner ring taken between the bottom of the outer raceway and the bore of the inner ring ranges from 1.1 and 1.5, in that the ratio between the radial thickness of the outer ring taken between the bottom of the inner raceway and the outer surface of the outer ring, and the outside diameter of the bearing ranges from 0.045 and 0.06, in that the ratio between the width of the rings and the diameter of the balls ranges from 1.7 and 2.2, and in that the ratio between the width of the rings and the radial thickness of the outer ring taken between the bottom of the inner raceway and the outer surface of the outer ring ranges from 3 and 4.2.

14. The ball bearing as claimed in claim 10, wherein the ratio between the radial thickness of the outer ring taken between the bottom of the inner raceway and the outer surface of the outer ring, and the diameter of the balls ranges from 0.4 and 0.7 and in that the ratio between the radial thickness of the outer ring taken between the bottom of the inner raceway and the outer surface of the outer ring, and the radial thickness of the inner ring taken between the bottom of the outer raceway and the bore of the inner ring ranges from 1.2 and 1.6, in that the ratio between the radial thickness of the outer ring taken between the bottom of the inner raceway and the outer surface of the outer ring, and the outside diameter of the bearing ranges from 0.055 and 0.75, in that the ratio between the width of the rings and the diameter of the balls ranges from 1.5 and 1.9, and in that the ratio between the width of the rings and the radial thickness of the outer ring taken between the bottom of the inner raceway and the outer surface of the outer ring ranges from 2.5 and 4.

15. The ball bearing as claimed in claim 10, wherein the ratio between the radial thickness of the outer ring taken between the bottom of the inner raceway and the outer surface of the outer ring, and the diameter of the balls ranges from 0.4 and 0.55, in that the ratio between the radial thickness of the outer ring taken between the bottom of the inner raceway and the outer surface of the outer ring, and the radial thickness of the inner ring taken between the bottom of the outer raceway and the bore of the inner ring ranges from 1.3 and 1.5, in that the ratio between the radial thickness of the outer ring taken between the bottom of the inner raceway and the outer surface of the outer ring, and the outside diameter of the bearing ranges from 0.065 and 0.08, in that the ratio between the width of the rings and the diameter of the balls ranges from 1.3 and 1.8, and in that the ratio between the width of the rings and the radial thickness of the outer ring taken between the bottom of the inner raceway and the outer surface of the outer ring ranges from 3 and 3.6.

16. The ball bearing as claimed in claim 9, wherein values of the outside diameter of the bearing, of the bore of the bearing, and of the width of the bearing are identical to those of a conventional ball bearing of the standardized ISO range, and with the ball diameter being less than a ball diameter for a conventional ball bearing of the standardized ISO range applicable to said ball bearing.

* * * * *